(No Model.)

G. W. SOULÉ.
BALING PRESS.

No. 437,257.

Patented Sept. 30, 1890.

Witnesses
E. F. Nottingham
G. F. Downing

Inventor
Geo. W. Soulé.
By his Attorney
H. A. Seymour

UNITED STATES PATENT OFFICE.

GEORGE W. SOULÉ, OF MERIDIAN, MISSISSIPPI.

BALING-PRESS.

SPECIFICATION forming part of Letters Patent No. 437,257, dated September 30, 1890.

Application filed October 11, 1888. Serial No. 287,816. (No model.)

*To all whom it may concern:*

Be it known that I, GEORGE W. SOULÉ, a resident of Meridian, in the county of Lauderdale and State of Mississippi, have invented certain new and useful Improvements in Baling-Presses; and I do hereby declare the following to be a full, clear, and exact description of the invention, such as will enable others skilled in the art to which it appertains to make and use the same.

My invention relates to an improvement in presses that are adapted for the baling of hay, straw, or other material, and of a type known as "continuous presses," deriving their title from the formation of bales successively and continuously by the introduction of charges or increments of material, the consolidated bales in advance of one that is being formed affording an abutment for the hay or other material as it is packed. In the class of hay or straw presses just mentioned the material to be pressed into bales is fed into a press-box in successive charges and there acted upon by a traverser or reciprocating plunger, the latter being moved by a horse-lever, and in some cases provision is made to release the plunger after a full stroke of the same, so as to utilize the rebound or expansion of the elastic packed material to return the plunger by impetus thus afforded, and place it ready to act upon another charge.

One object of my invention is to provide a hay or straw press of the type mentioned with a simple, powerful, and novel device whereby the travel of the plunger or traverser will be rendered comparatively rapid during its initial stage and gradually diminish in speed while the power of compression is correspondingly increased until the full travel of the traverser is attained.

A further object is to provide a reliable means for graduating the retrograde motion of the traverser when it is released after full stroke, so as to prevent an objectionable shock.

A further object is to furnish a means of adjusting the pivotal connection of the horse-lever with the frame of the press, so that said lever may be permitted to swing in a horizontal plane irrespective of the inclination of the frame of the press to the horizon.

A further object is to furnish a hay-press with a feeding mechanism that will facilitate the introduction and compression of loose material into the press-box of the machine.

A further object is to furnish a set of strengthening-braces for the frame and rocking shaft of the press that will stiffen the frame and at the same time support the shaft in position and prevent it from being broken.

With these objects in view my invention consists in certain features of construction and combination of parts, which will be hereinafter described, and indicated in the claims.

Referring to the drawings making a part of this specification, Fig. 3ª shows detail views of a hay-retaining device which acts to restrain too great an expansion of the packed material. Fig. 10 is a cross-section of the frame of the press through the front axle.

This press is preferably mounted on four wheels for purposes of portability; but the wheels may be dispensed with and the device rendered stationary, if desired. The frame of the press is given a nearly horizontal position on the wheels, it being supported upon bolsters, and the forward set of wheels being provided with a swiveling device that will permit the press to be turned around when in transit from one point to another.

The frame of the press consists of four long timbers A A', that form the longitudinal corner-pieces of a rectangular frame, as shown in Fig. 10. These timbers are held together by the side pieces 9 10 11 and the cross-pieces 1 2 3 4 5 6 7, that are properly secured to the top and bottom stringers A A', so as to afford a stable frame. It will be noticed that the front portion of the frame, bounded at the ends by the upright-frame studs 8 and 11, is closed on the sides and bottom to produce a compression-chamber, and that the sides of the frame are left open in the rear of the vertical studs 11, while a deck $A^2$ and floor $A^3$ (see Fig. 2) extend to the rear end of the frame. The frame-timbers A A' and the deck and floor $A^2 A^3$, formed by covering these timbers with suitable material, together form a continuous passage that is open on the sides to afford access to the bale for adjusting the tie-bands thereon. By reference to Fig. 10 it will be seen that the deck $A^2$ of the tying-chamber just mentioned is located near the upper side of the longitudinal timbers A, while the floor $A^3$ is affixed to the lower longitudinal timbers A', nearer the lower than the upper end thereof, so that the compressed material as it issues from the chamber B is held centered by the beveled corners $A^4$ of the timbers A A' as guideways, and prevented from lateral deviation without the provision of any other appliances for the attainment of such a result.

As the generic principle of this form of press consists in the gradual consolidation of hay or other material by the progressive movement of a traverser or plunger, which forces successive charges of the material forward to produce a continuous bale, it is necessary to afford a proper resistance to the packed material in its forward movement so as to insure a proper compression of the bale. To effect the retardation by frictional resistance of the packed material, and thus afford an abutment for the succeeding charges that are acted upon by a traverser, I provide any proper number of vertical set-screw bolts $b$ $b^2$, which by their adjustment will draw the top and bottom portions of the forward part of the frame together, which will cause a gradual increase of resistance to the packed material until the bale is discharged at the front end. These screws may have nuts on their upper ends, as at $6^a$, or be provided with cross-handled nuts, (shown at $b'$,) the latter being preferred, as affording a convenient means for the quick and accurate graduation of pressure to attain the desired result.

Upon the inclosed portion of the frame that constitutes the compression-chamber B a hopper or feed-chute E is mounted having its rear edge in vertical alignment with the studs 10.

Figures 1, 4:
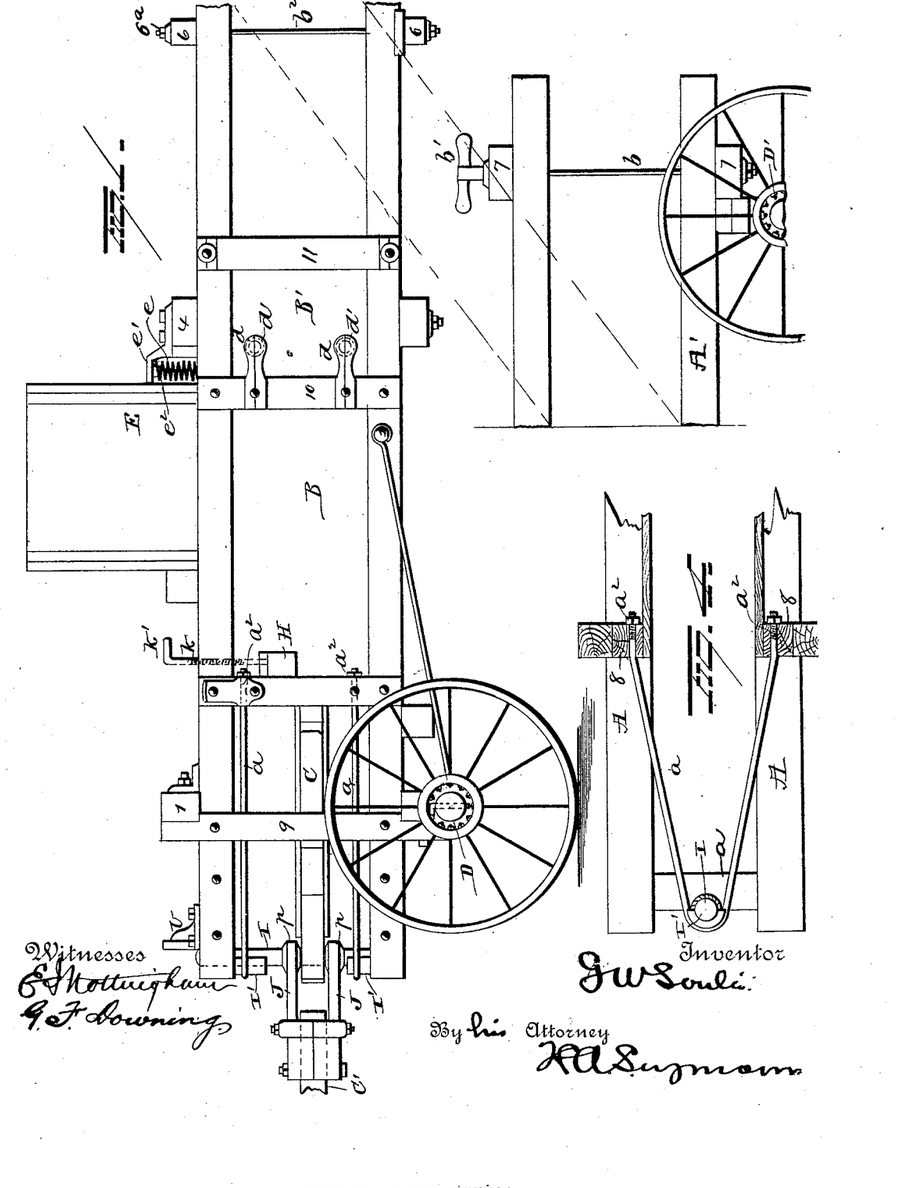
Figure 1 is a side elevation of the press mounted on wheels.
Fig. 4 is a plan view of a detached portion of the frame, showing truss-rods in position.

Upon the rear cross-timbers $a'$ of the frame a vertical shaft I is held in suitable boxes I', which latter are engaged by the loop-bolts $a$, that are bent so as to embrace the rear shells of the boxes I', and by extension of their limbs rearwardly enter the studs 8 of the frame, to which they are secured by nuts that engage their threaded ends $a^2$. (See Figs. 1 and 4.) The loop-bolts $a$ stiffen the frame as truss-rods, and they also support the shaft I, which is designed to sustain as an axis the ovate cam C, that by its semi-revolution actuates the plunger or traverser F.

Figures 2, 5:
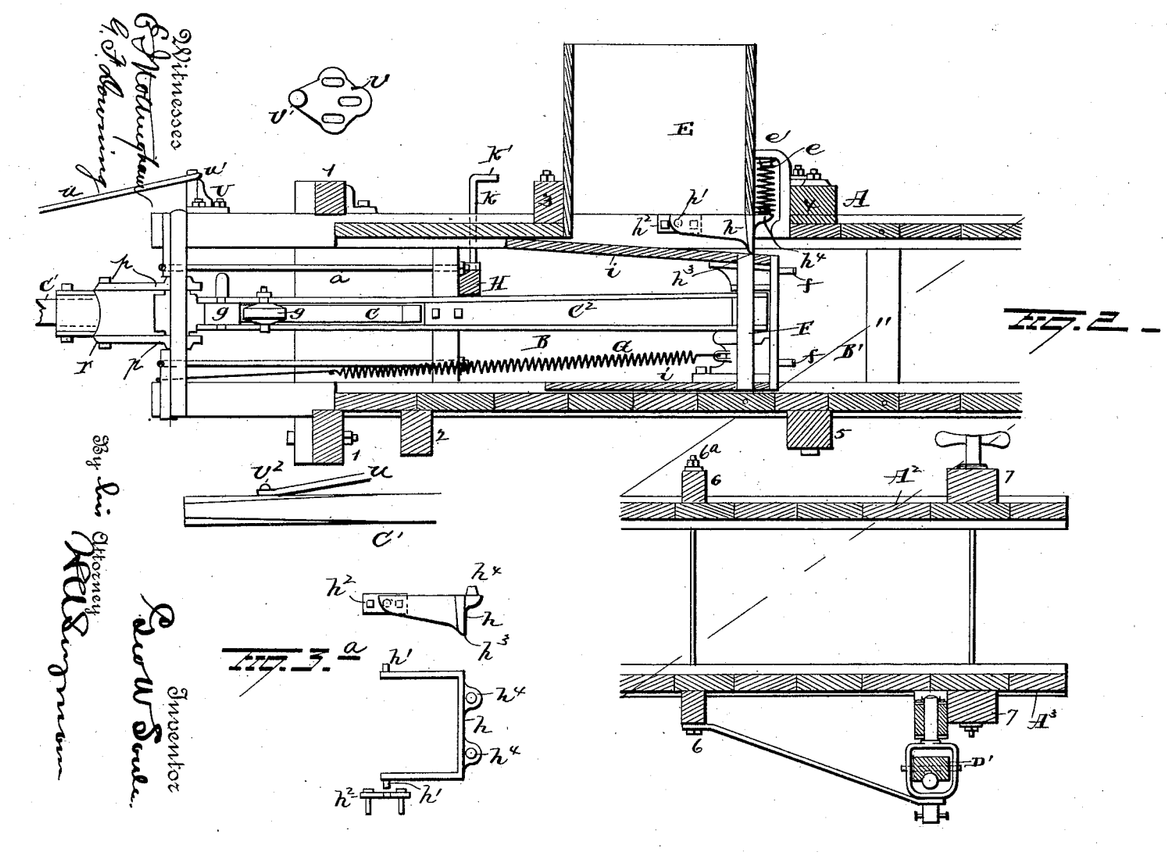
Fig. 2 is a vertical longitudinal section of the press through its center of width.
Figs. 5 and 6 are views of the ovate internal cam, with the horse-lever shown in the different positions assumed during its semicircular sweep.
Figures 3, 4:
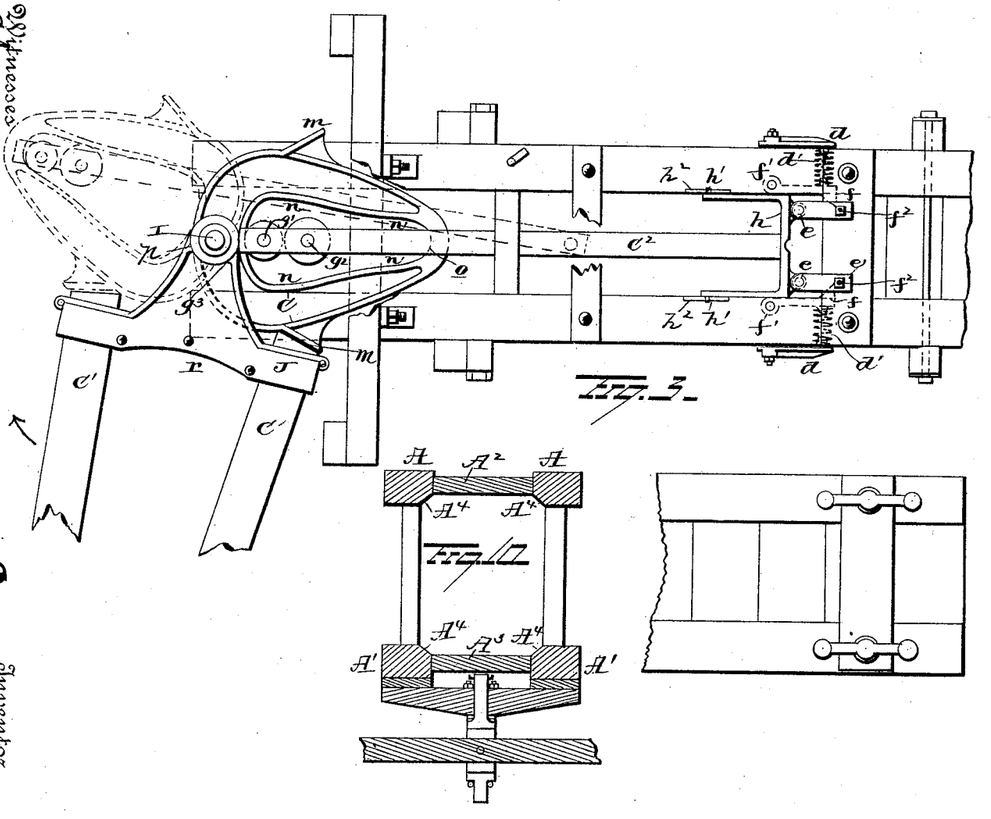
Fig. 3 is a top plan view of the device with the deck of the front or power end removed to show interior parts.

In Figs. 2 and 3 will be seen the cam S, which is of peculiar form, its bearing-surface being ovated to produce a wider forward transverse diameter between the points $n$ $n$ than at the rearward portion between the points $n'$ $n'$, the conformation of the inner contour or bearing-face of the cam being substantially pear-shaped, so as to afford easy regular curves from the widest to the narrowest space between the cam-surfaces.

The traverser F is made of a width and height to slide easily in the compression-chamber B, which is rectangular in cross-section, and to the traverser a connecting-beam $C^2$ is pivotally secured near its center, which beam extends forwardly a sufficient length to project within the cam C when the traverser F is at the terminus of its travel.

Near the free front end of the connecting-beam $C^2$ two anti-friction rollers or small wheels $g$ are pivoted, these wheels being located in a horizontal longitudinal slot, so as to expose the peripheral faces of the wheels, which have bearing-contact on the ovate surface of the cam-plate C. The distance between the pivot centers $g'$ $g^2$ of the wheels $g$ is so proportioned to the maximum width between the points $n$ $n$ of the cam C that their faces will have rolling engagement therewith when the cam and beam $C^2$ are in the relative positions shown in Fig. 6.

Reference to Fig. 3 will show the relative positions of the cam-plate C, beam $C^2$, and traverser F when the last-named part is at either end of its reciprocal travel, the parts being shown in dotted lines when adjusted at the front end of the compression-chamber to receive a charge, while the rear adjustment of the traverser is shown in full lines. It will be seen that when the cam-plate C is in the position shown in dotted lines the wheels $g$ will be at the outer or narrow portion of the cam at the greatest distance from the pivot-center of the cam-plate, and that as the cam is moved in a horizontal plane in either direction the wheels $g$ will engage the cam-surface, the forward wheel impinging against one side of the cam, while the other or rear wheel is brought into contact with the opposite sloping side of the cam, a further movement of the cam-plate C forcing the traverser F rearwardly in an obvious manner to compress material deposited in the chamber B. When the traverser F reaches the extreme rearward limit of its travel, this will be determined by the engagement of the forward wheel $g$ of the beam $C^2$ with the cam-surface at the point $g^3$, as shown in Fig. 3 in full lines, the beam $C^2$ being at right angles to the traverser-face and located midway between the contracted walls of the cam at its opposite end.

Upon the outer surface of the cam C, at opposite points and about midway between the axis of the vertical supporting-shaft I and the outer extremity of this cam-plate, two abutments $m$ are formed. These are of a suitable area, and their vertical faces are given such an inclination toward the center of the shaft I that they will each furnish a parallel surface for contact with the impinging ends of a compound lever, which will be more fully explained.

In order to give the cam C a semi-revolution in either direction along with the shaft I, on which it is mounted and secured rigidly, there is a yoke-plate J provided, which is loosely mounted on the shaft I by means of hubs $p$, that are located above and below the cam-plate C. Said yoke J may be made of two similar plates connected at their outer edges $r$ (see Fig. 3) by bolts, these plates being securely attached to the two mating-beams C', which beams extend diagonally toward each other in a horizontal plane, so as to be united at their outer ends, (not shown,) and thus produce a braced lever for the actuation of the cam-plate C.

It is usual in presses of the continuous type to depend on the elastic rebound of the pressed material to return the plunger or traverser to the point where it will clear the hopper and permit hay, straw, or other material to be introduced in rear of the traverser to be acted upon by it. In this press the rebound is utilized to a certain extent; but as this is not reliable under all conditions of service other provision is made to supplement its force and insure a positive return movement of the traverser as soon as it is released.

In the operation of packing hay or straw the semi-revolution of the cam-plate C in either direction from side to side of the press-frame will cause the wheels $g$ to impinge against the ovate face of the cam, as previously explained, and by the peculiar form of said face the beam C² and attached traverser F will be projected rearwardly with increasing force, as the cam-plate is revolved until the full stroke of the cam is effected. To render this manifest, if the relative position of the cam and beam be as shown in dotted lines in Fig. 3, which locates the traverser so as to clear the hopper E, a revoluble movement of the horse-lever C' in the direction of the arrow will cause the traverser to move at first rapidly to act on the loose material, and as the beam is swung around the wheels $g$ will engage with the gradually-widening throat of the ovate cam-orifice, so that the speed of travel of the traverser F will be proportionately decreased, while the power of the cam will in the same ratio increase to overcome the resistance of the hay or other material being compressed. (See Figs. 5 and 6.) When a full stroke has been given the traverser F by a semi-revolution of the horse-lever, which abuts against the shoulder $m$ of the cam-plate and pushes it around, the parts will have assumed the position shown in full lines in Fig. 3, and the outer wheel $g$ of the beam C² will have bearing-contact with the portion of the cam-surface $g^3$ that is nearest the pivot-shaft I. It will be apparent that if the horse-lever C' is partially rotated to locate the beam and its anti-friction wheels $g$ in the position shown in Fig. 5 to clear the dead-center line, the traverser, being acted upon by the elastic expansion of the compressed hay, will be projected outwardly to the limit of its reversing movement, which will be limited by the contact of the outer wheel $g$ with the closed end $o$ of the cam-plate C, this movement being controlled in a manner that will be hereinafter described.

In order to render the reverse motion of the traverser F positive when the material is sufficiently compacted or is inelastic, as may be the case, it is preferred to lower the end of the frame of the press sufficiently to permit the gravity of the traverser and attached parts to aid its rearward movement, or a spring G may be attached to the traverser and frame (see Fig. 2) to coact with the rebound of the compressed material and the gravity of the traverser to effect the reversed travel of the latter.

Upon the upper and lower edges of the traverser F two guide-wings $i$ are affixed, which extend forwardly. These fit loosely within the press box or chamber B, and the top wing is of such proportionate length that it will close the throat of the feed box or hopper E when the traverser F is thrown rearward a full stroke, and thus prevent any loose material from being deposited in front of the traverser when it is in such a position.

As it is evident that if the material which is introduced through the hopper E into the compression-chamber B is not in some way held from too free an expansion, much effective force of the machine will be wasted and the space for the introduction of a charge of loose material restricted by such excess of expansion. To prevent the pressed material from improper rearward expansion, the hook-plates $f$ (see Fig. 3) are provided. These are embedded in recesses in the frame or sides of the compression-chamber B and pivoted at one end $f'$, so that their forward hooked ends $f^2$ may be projected into the compression-chamber by the pressure of the springs $d'$, the shape of these hooked ends being such that the rearward movement of the traverser will press them back into the recesses of the frame, and when the traverser is reversed the hooks will be forced by the action of the springs $d'$ a limited distance into the compression-chamber, as stated, so as to abut their forward faces against the expanding hay or other material that has been compressed by the traverser during its rearward movement, the spring $d'$ being held in place by the clamp-plates *d*, as shown in Fig. 3.

The pivoted restraining-hooks *f* are located on each side of the compression-chamber in pairs properly spaced apart, and to supplement their restraining action a pivoted folder-plate *h* is employed, which latter is constructed, preferably, as shown in Figs. 3 and 3$^a$, the latter being side and edge views of said folder-plate detached from the press. The folder-plate *h* is provided with parallel limbs, which terminate in the pintles *h'*, that engage perforated plates *h$^2$*, which are secured in the side edges of the top portion of the frame, adapting the holder to rise in the hopper E and holding the hook-shaped edges *h$^3$* of the folder-plate across the compression-chamber slightly in front of the hooks *f*, the folder-plate being pressed downward a limited distance by the springs *e*, that engage the curved horns or nipples *h$^4$*, which project from the forward edge of the folder-plate, as shown. The opposite ends of the spiral springs *e* are supported in place by the bracket-arms *e'*, that are provided with nipples *e$^2$*, similar to *h$^4$*, and thus retain the springs partially compressed and free to exert pressure upon the pivoted folder-plate.

In action the folder-plate *h*, from its peculiar form, will permit the traverser F to move freely rearward the full stroke of the cam C, and thus force a charge of hay or other material into the bale-forming chamber B' in advance of said traverser, and when the traverser is reversed to act upon another charge the folder-plate, being released from its enforced upward swinging adjustment effected by the traverser, will be pressed down by the springs *e* to receive the impact of the expanding material, which has aided to give the traverser a reverse movement. When the folder-plate is pressed into the chamber B, as just stated, its edges *h$^3$* will bend the hay-stems inwardly and prevent them from lodging between the forward edge of the traverser and the edge of the feeding-hopper E, thus avoiding obstructions to the forwarding movement of the traverser and affording a smooth top surface to the bale, free from projecting ends of hay.

Reference to Fig. 2 will show that the connecting-beam C$^2$ is tapered of a regularly-decreasing thickness, vertically considered, from the point of attachment to the traverser forward to its point of contact with the cam-plate C.

It is apparent that the reverse motion given to the traverser F and its attached connecting-beam C$^2$ by the expansion of the compressed material and the gravity of these parts sliding down the inclined surface of the frame, possibly supplemented by the action of a spring G or equivalent device, will, if unchecked, cause a violent impact of the forward roller *g* on the terminal wall of the cam-plate C. To overcome this objectionable abutment of the roller *g* on the cam C, the brake-bar H is provided. This is located transversely of the chamber B at a proper point, and is rendered vertically adjustable by its connection with the screws *k*, which are provided with handles *k'*, so that the brake-bar H may be adjusted to gradually increase its frictional contact with the upper surface of the beam C$^2$ when the traverser is thrown back, and thus permit the rapidity of reverse movement to be graduated to reverse the traverser F, in a quiet manner, avoiding objectionable shock of the wheel *g* with the cam C.

Figures 5, 6, 7, 8:
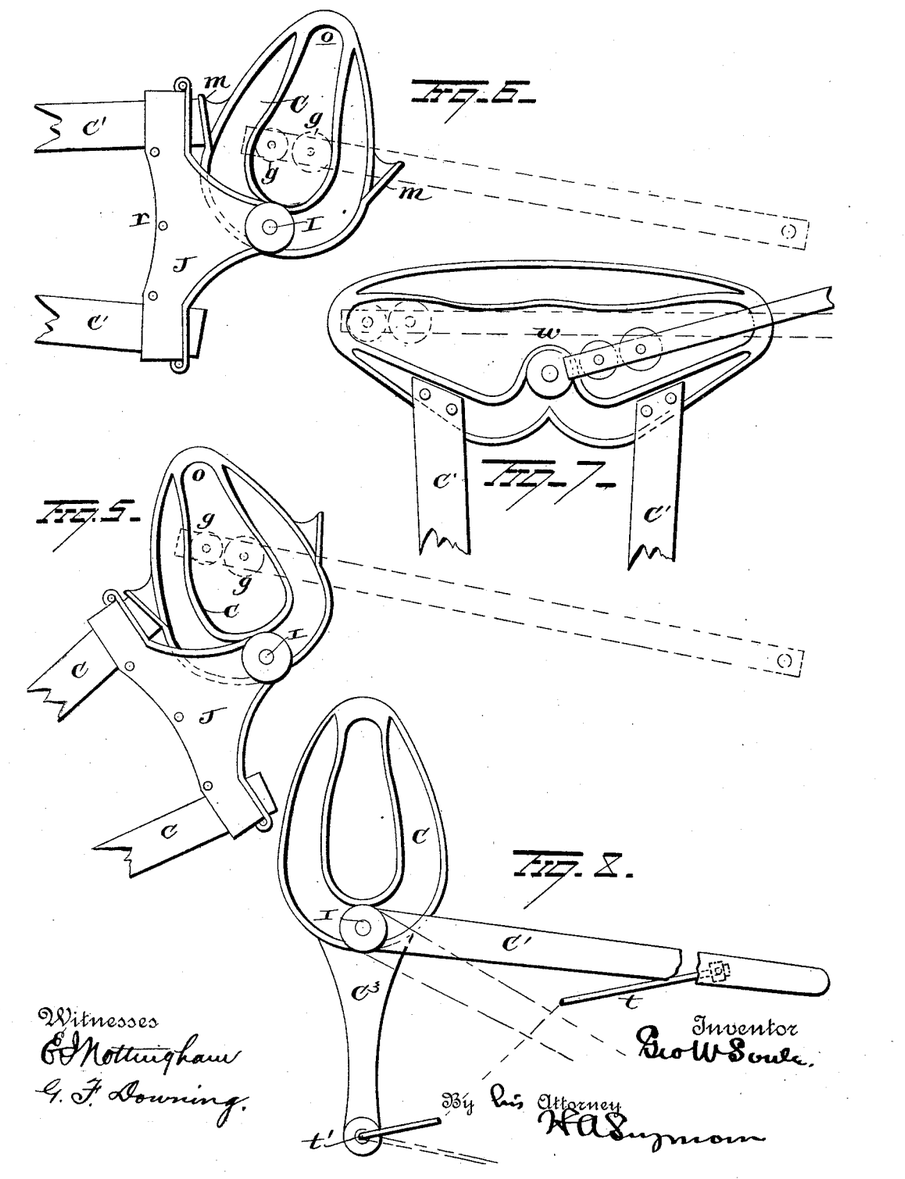
Fig. 7 is a modified form of the ovate cam, showing duplicate integral cams arranged to operate alternately on a single horse-lever.
Fig. 8 is another modification of the ovate cam, exhibiting a single cam, which is adapted to be operated by draft-power directly applied to the horse-lever.
Figure 9:
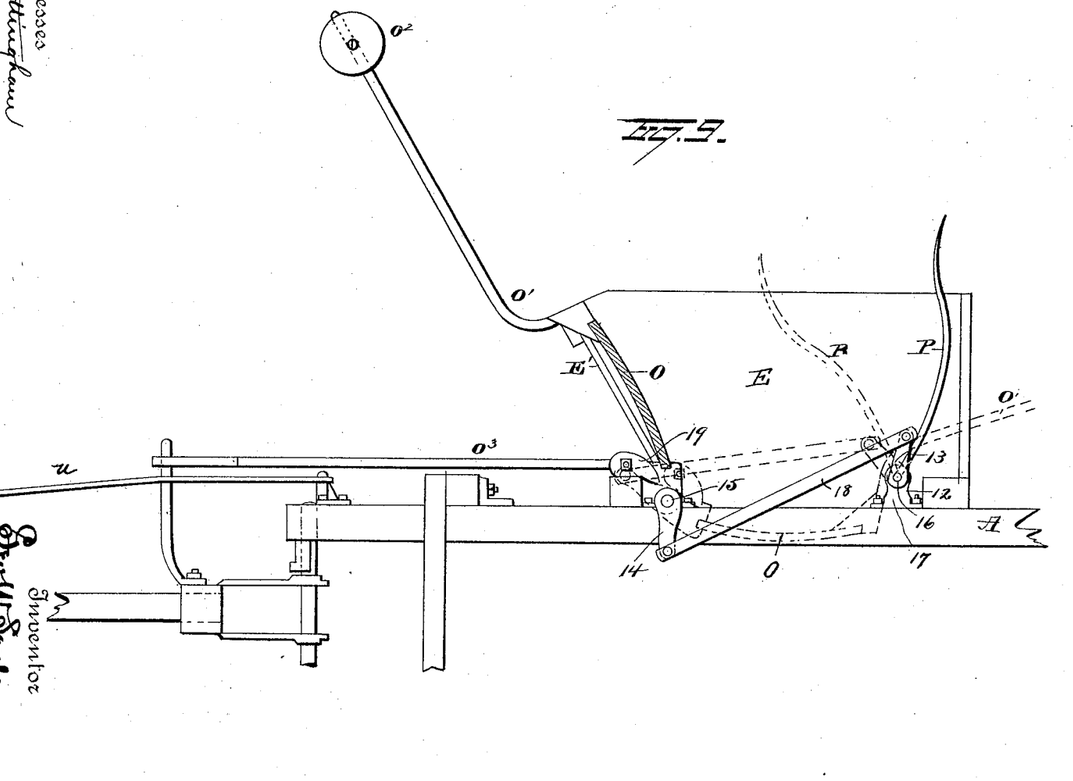
Fig. 9 is a side elevation of the mechanism employed to feed hay or straw into the press-box of the machine.
Figure 11:
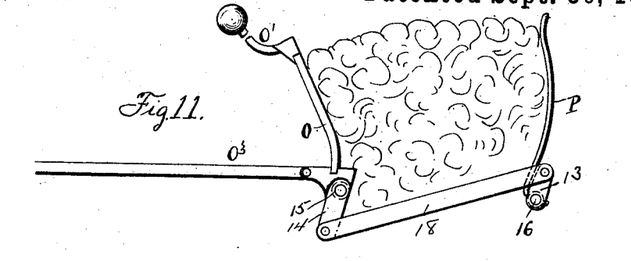
Figs. 11, 12, and 13 are views in side elevation, partly in section, showing the feeding mechanism in its several positions.
Figure 12:
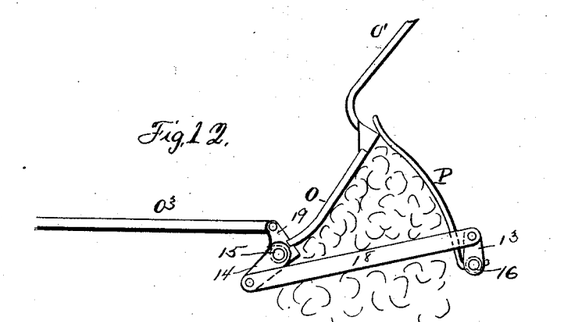
Figure 13:
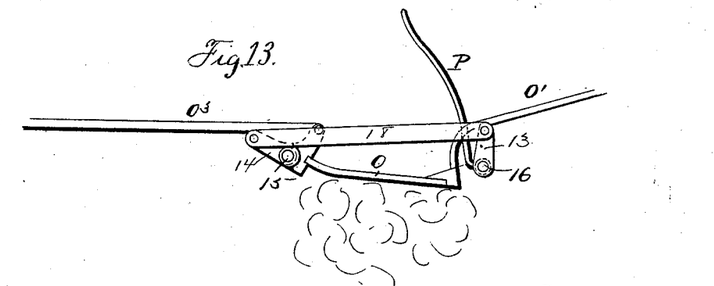

In Fig. 7 a modified form of the cam C is shown. In this modification two ovate integral cams are employed, which are secured to the lever-limbs C' so as to force the connecting-beam C$^2$ and attached traverser forward by a semi-revolution of the cam-head, the beam C$^2$ sliding through the throat *w* between the twin cam-plates, as is shown in dotted lines when the full forward stroke has been made and it is necessary to release the traverser for a reverse movement of the same.

In Fig. 8 a form of construction is shown in which the ovate cam-plate C is provided with an extended arm C$^3$, that projects beyond the vertical shaft I, on which the cam-plate and lever are supported to swing in a horizontal plane, a diagonal brace *t* extending from the lever to the outer end *t'* of the arm C$^3$, thus adapting the lever to move the cam by a draft upon said lever, which will pull the cam-plate around its pivot-center I instead of pushing it, as shown in the other figures, where the abutments *m* are provided.

It is evident that in the preferred form of the cam C, as well as the modifications of this device herein shown, the semi-revolution of the lever in either direction will operate the connecting-beam and traverser, so that there is no time lost or tedious backing of the horse needed to resume pressure when there has been a fresh charge inserted in the compression-chamber B'.

It may here be explained that as the front portion of the frame of the hay-press is given an inclination to the horizon to cause the traverser F and attached beam C$^2$ to be readily forced to the front, so as to vacate the compression-chamber B and permit the introduction of a fresh charge of material therein, it is desirable to provide an efficient means for the independent support and adjustment of the lever C', so that its plane of motion will be horizontal. To effect the desideratum just mentioned, the horse-lever is furnished with a stay-rod *u*, which is fastened to it at the point *u$^2$*, and extends rearwardly in line with the center of this composite lever so as to engage loosely the vertically-projecting pintle *u'* on the bracket U, which latter is mounted on the portion of the frame, as shown in Fig. 2, so that the lever may be supported by this connection and adjusted to lie in a horizontal plane, its loose connection with the shaft I permitting such an adjustment of parts irrespective of the cam-plate and shaft.

The bracket U may have slots in which the bolts that secure it upon the frame are inserted, so that the bracket can be moved forward or rearward a limited distance to properly adjust it, or the position of this supporting-bracket may be made immovable and the proper degree of adjustment given to the horse-lever by the proper attachment of the stay-rod $u$ at $u^2$ upon the horse-lever C', as previously mentioned.

In Figs. 9, 11, 12, and 13 a feeding device is shown which is available for the rapid insertion of a charge of hay or other material that is being pressed. This consists of a flat slatted frame O, secured on a shaft 15, which extends across the hopper E near its front transverse wall E', and is journaled in boxes affixed to the upper timbers A of the press-frame, which will allow the frame O to be vibrated forwardly and downwardly, there being a handle-bar O' attached to the frame O at about its center of width, said bar projecting upwardly and forwardly to receive a weight $O^2$, adjustably held thereon by set-screw or other means, which by its gravity aids the positive action of the slatted frame O when it is rocked to press loose material down into the chamber B.

On the cross-shaft 16, which is journaled at its ends in boxes 17, is mounted and secured another slatted presser-frame P. It is adapted to vibrate toward the frame O by means of the cranks 13 14, which are affixed, respectively, to the ends of the shafts 15 16, and have their outer ends pivotally connected to each end of a bar 18, so that they will be actuated simultaneously.

The frame P has its slats bent into arch form, the curvature of which is such as to conform to the sweep of the outer edge of the frame O, which edge moves near to the frame P, when both are operated together to force a charge of hay into the chamber B below them. In operation of the feeder the slatted frames will be spread apart at their upper edges, so as to afford room for the free insertion of hay or other material to be packed. Then by an endwise movement of the horizontal pusher-bar $O^3$, which is actuated by lever C', and attached to a bracket-arm 19 on the shaft 15, the frame O will rock down to a nearly horizontal position and the frame P assume an inclined position to just clear the edge of the outer frame, both acting together to press hay or other material down into the chamber B, the respective positions assumed by these presser-frames being shown in dotted lines in Fig. 9 and in full lines in Figs. 11, 12, and 13. A reverse movement of the bar $O^3$ will again elevate the frame to receive a charge, this position being shown in full lines. (See Figs. 9, 11, 12, and 13.)

Many slight changes might be made in the details of construction of this device within the scope of my invention. Hence I do not wish to restrict it to the exact form and arrangement of parts herein shown; but, Having fully described my invention, what I claim as new, and desire to secure by Letters Patent, is—

1. The combination, with a compression-chamber, a traverser, a pitman the upper surface of which is inclined upwardly from its outer or free end toward its inner end, and devices for actuating the traverser in one direction, of a brake, the latter adapted to be adjusted to engage the upper surface of the pitman at any point during its forward throw.

2. The combination, with a compression-chamber, a traverser, a pitman the upper surface of which is inclined upwardly from its outer free end toward its inner end, and devices for actuating the traverser in one direction, of devices for retracting the traverser, and a brake, the latter adapted to be adjusted so as to engage the upper surface of the pitman at any point during its forward throw.

3. In a baling-press, the combination, with a compression-chamber, a traverser, a pitman having an engaging device on its free end, and a swinging plate having an internal oblong bearing-surface, against which the engaging device on the free end of the pitman bears, and by which the traverser is moved in one direction, of a lever for moving the plate, substantially as set forth.

4. In a baling-press, the combination, with a compression-chamber, a traverser, and pitman, the latter having rollers at its free end, of a pivoted cam having an internal ovate bearing-surface arranged, substantially as shown, with relation to the axis of the cam for engaging the rollers on the pitman.

5. In a baling-press, the combination, with a compression-chamber and a traverser, of a plate having an internal elongated cam, the bearing-surfaces of which gradually diverge as they approach the axis of the cam-plate, and a pitman connected to the traverser and provided with rollers engaging the bearing-surfaces of the cam-plate, substantially as set forth.

6. In a baling-press, the combination, with a compression-chamber and a traverser, of a loosely-swinging plate having an internal elongated cam, the bearing-surfaces of which gradually diverge as they approach the axis of the plate, a pitman connected to the traverser and provided with rollers engaging the bearing-surfaces of the cam-plate, and an independently-swinging lever for turning the swinging plate, substantially as set forth.

7. In a baling-press, the combination, with a compression-chamber and a traverser, of a loosely-swinging plate having an internal elongated cam, the bearing-surfaces of which gradually diverge as they approach the axis of the plate, a pitman connected to the traverser and provided with rollers engaging the bearing-surfaces of the cam-plate, and an independently-swinging lever for turning the swinging plate, substantially as set forth.

8. In a baling-press, the combination, with a compression-chamber, an upright shaft, and truss-rods bracing the upper and lower ends of said shaft, of a plate mounted on said shaft and provided with an elongated cam-slot, the bearing-surfaces of which gradually diverge as they approach the shaft, a pitman connected to the traverser and provided with a pair of rollers, which latter move in contact with the bearing-surfaces of the cam-slot, and a lever mounted on the vertical shaft and adapted to actuate the cam-plate, substantially as set forth.

9. In a baling-press, the combination, with a compression-chamber, a traverser, and means for moving the traverser forwardly in the compression-chamber, of two pivoted frames located on opposite sides of the feed-opening to the compression-chamber, a bar loosely connecting said frames, whereby they are simultaneously moved toward each other for forcing the material into the compression-chamber, and a pusher-bar connected to one of said frames for actuating them, substantially as set forth.

10. In a baling-press, the combination, with two upright frames affixed to journaled shafts supported in boxes so as to rock with the frame, of cranks mounted on said shafts and connected pivotally by a bar, said cranks being set so as to rock the frames toward each other, and a pusher-bar pivotally attached to an arm affixed to one of the journaled shafts and adapted to rock the frames simultaneously toward each other when the bar is moved endwise, substantially as set forth.

11. In a baling-press, the combination, with a frame which is inclined downwardly at its rear end, a compression-chamber, a traverser, a cam-plate having a pivot-shaft journaled in the frame, and a horse-lever loosely mounted on the pivot-shaft, of a stay-rod attached by one end to the horse-lever, and a bracket to which the other end of the stay-rod is pivoted, substantially as set forth.

In testimony whereof I have signed this specification in the presence of two subscribing witnesses.

GEORGE W. SOULÉ.

Witnesses:
W. H. CURTIS,
R. M. BOURDEAUX.